(12) United States Patent
Kanagarathinam et al.

(10) Patent No.: US 11,303,572 B2
(45) Date of Patent: Apr. 12, 2022

(54) METHODS AND SYSTEMS FOR ACCOUNTING FOR DATA USAGE IN MPTCP

(71) Applicant: Samsung Electronics Co., Ltd., Suwon-si (KR)

(72) Inventors: Madhan Raj Kanagarathinam, Bangalore (IN); Young-Ho Lee, Suwon-si (KR); Giri Venkata Prasad Reddy, Bangalore (IN); Wang-Keun Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 16/618,617

(22) PCT Filed: Jun. 1, 2018

(86) PCT No.: PCT/KR2018/006307
§ 371 (c)(1),
(2) Date: Dec. 2, 2019

(87) PCT Pub. No.: WO2018/222007
PCT Pub. Date: Dec. 6, 2018

(65) Prior Publication Data
US 2020/0186474 A1 Jun. 11, 2020

(30) Foreign Application Priority Data

Jun. 2, 2017 (IN) .......................... IN201741019463
May 4, 2018 (IN) ....................... IN2017 41019463

(51) Int. Cl.
*H04L 12/801* (2013.01)
*H04L 12/26* (2006.01)
(Continued)

(52) U.S. Cl.
CPC ........ *H04L 47/193* (2013.01); *H04L 43/0811* (2013.01); *H04L 43/0876* (2013.01);
(Continued)

(58) Field of Classification Search
CPC ............... H04L 47/193; H04L 43/0811; H04L 43/0876; H04L 47/31; H04L 69/14;
(Continued)

(56) References Cited

U.S. PATENT DOCUMENTS 10,070,246 B2 * 9/2018 Jung ................. H04W 52/0206
2003/0025832 A1 * 2/2003 Swart ................. H04N 21/2343
348/461
(Continued)

FOREIGN PATENT DOCUMENTS

KR    10-2013-0128482 A    11/2013

OTHER PUBLICATIONS

WonderShare,"Top 10 Data Usage Tacking Apps for Your iPhone", https://www.wondershare.com/ios/how-to-check-data-usage-on-iphone.html#toTop, Apr. 7, 2016.
(Continued)

*Primary Examiner* — Ajit Patel
*Assistant Examiner* — Wilfred Thomas
(74) *Attorney, Agent, or Firm* — Jefferson IP Law, LLP

(57) ABSTRACT

Embodiments herein disclose methods and systems for accounting for MPTCP data usage. The embodiments include tracking MPTCP data usage of a plurality of applications. The embodiments include reporting the MPTCP data usage information to a data tracking module. Each of the plurality of applications is associated with a UID, which is tagged with MPTCP packets of the plurality of applications. The MPTCP packets of the plurality of applications can be transferred through at least one sub-socket, in at least one sub-flow. The at least one sub-flow can be associated (Continued)

with the system (OS) ID. The embodiments include updating the system UID, associated with the at least one sub-flow, with UIDs of the applications, whose data is included in the at least one sub-flow.

6 Claims, 14 Drawing Sheets

(51) Int. Cl.
*H04L 12/833* (2013.01)
*H04L 29/06* (2006.01)
*H04L 47/193* (2022.01)
*H04L 43/0811* (2022.01)
*H04L 43/0876* (2022.01)
*H04L 47/31* (2022.01)
*H04L 69/14* (2022.01)
*H04L 69/163* (2022.01)
*H04L 69/22* (2022.01)

(52) U.S. Cl.
CPC .............. *H04L 47/31* (2013.01); *H04L 69/14* (2013.01); *H04L 69/163* (2013.01); *H04L 69/22* (2013.01)

(58) Field of Classification Search
CPC ....... H04L 69/163; H04L 69/22; H04L 69/16; H04L 45/00
See application file for complete search history.

(56) References Cited

U.S. PATENT DOCUMENTS

| | | | |
|---|---|---|---|
| 2003/0028889 A1* | 2/2003 | McCoskey | G06F 21/10 725/91 |
| 2007/0121626 A1* | 5/2007 | Shepard | H04L 43/00 370/389 |
| 2011/0296006 A1* | 12/2011 | Krishnaswamy | H04L 29/12952 709/224 |
| 2012/0069748 A1 | 3/2012 | Van Den Bogaert | |
| 2012/0102148 A1* | 4/2012 | Arolovitch | H04L 61/2007 709/217 |
| 2012/0144062 A1* | 6/2012 | Livet | H04W 60/005 709/239 |
| 2012/0275323 A1 | 11/2012 | Reznik et al. | |
| 2014/0122647 A1* | 5/2014 | Mischook | H04L 67/28 709/217 |
| 2014/0317284 A1 | 10/2014 | Navarette et al. | |
| 2014/0362765 A1 | 12/2014 | Biswas et al. | |
| 2015/0215225 A1 | 7/2015 | Mildh et al. | |
| 2015/0295782 A1* | 10/2015 | Ramamoorthy | H04L 47/193 715/736 |
| 2016/0212759 A1* | 7/2016 | Schliwa-Bertling | H04L 45/245 |
| 2016/0226738 A1 | 8/2016 | Zalmanovitch et al. | |
| 2017/0093961 A1* | 3/2017 | Pacella | H04L 67/141 |
| 2017/0302764 A1* | 10/2017 | Singhee | H04L 69/161 |
| 2018/0206136 A1* | 7/2018 | Chow | H04L 43/0876 |
| 2018/0212803 A1* | 7/2018 | Vanamurthy | H04L 45/245 |
| 2018/0241648 A1* | 8/2018 | Jenkins | H04L 69/02 |
| 2018/0254979 A1* | 9/2018 | Scahill | H04L 47/193 |
| 2018/0351852 A1* | 12/2018 | Boucadair | H04L 61/2007 |

OTHER PUBLICATIONS

Indian Examination report dated Jun. 10, 2020, issued in Indian Application No. 201741019463.

* cited by examiner

[Fig. 1]
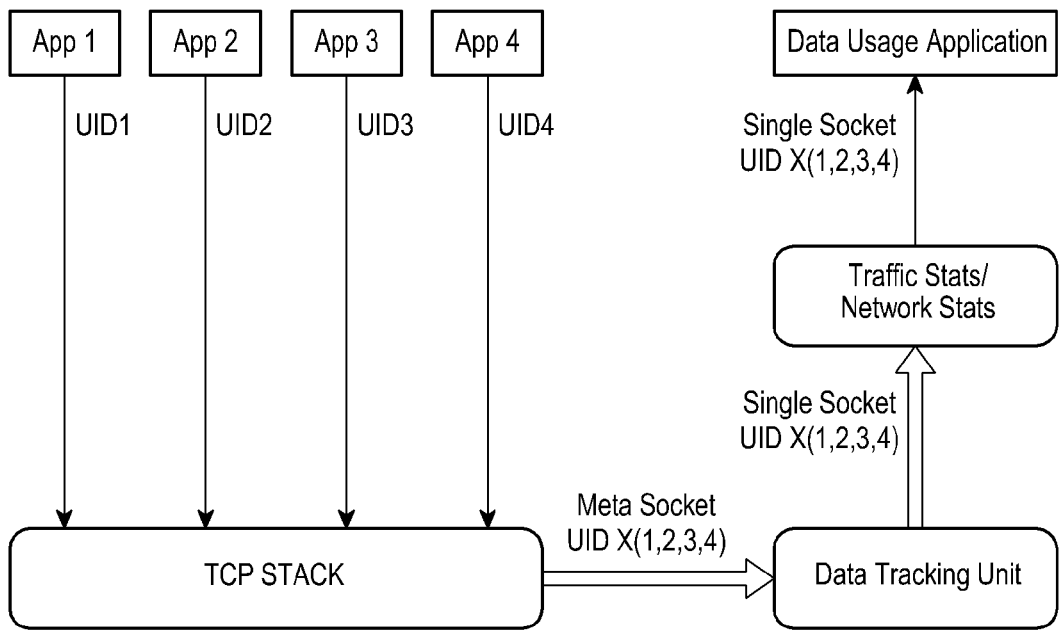
[Fig. 2]
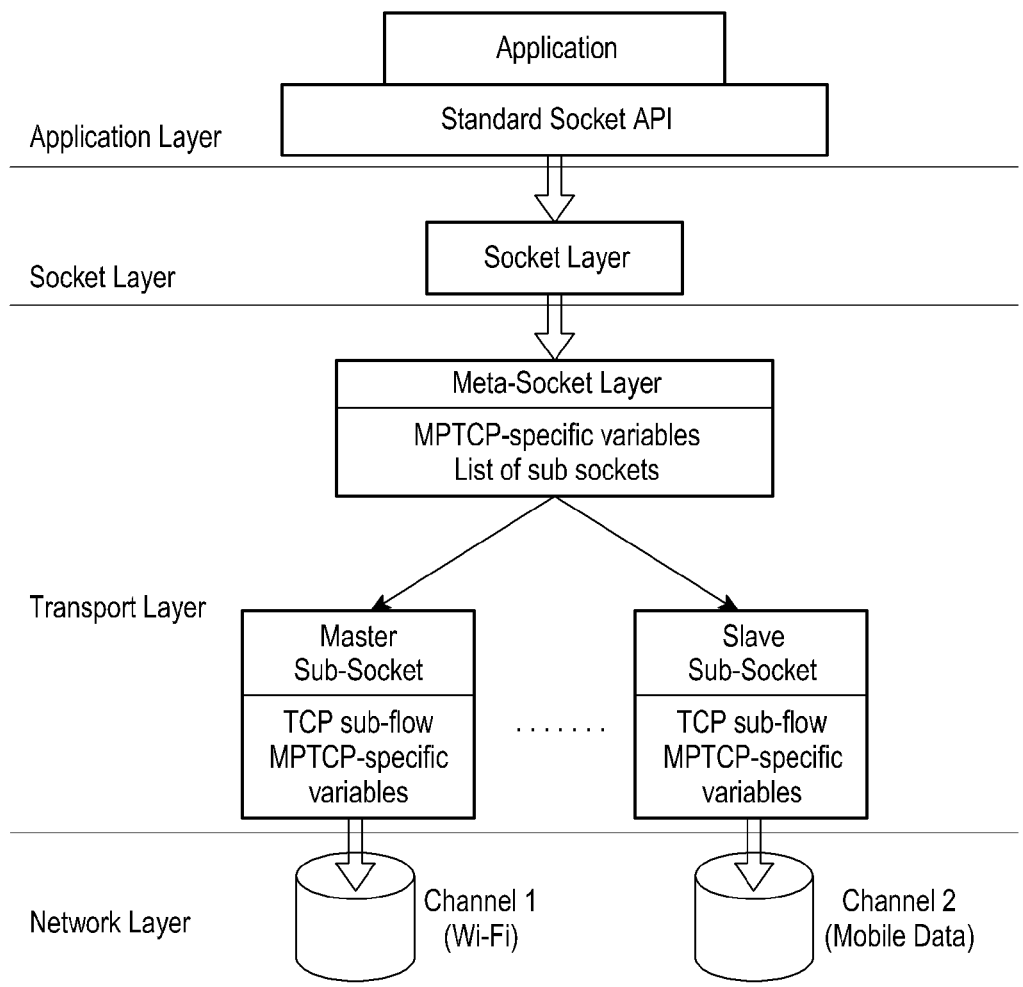

[Fig. 3A]
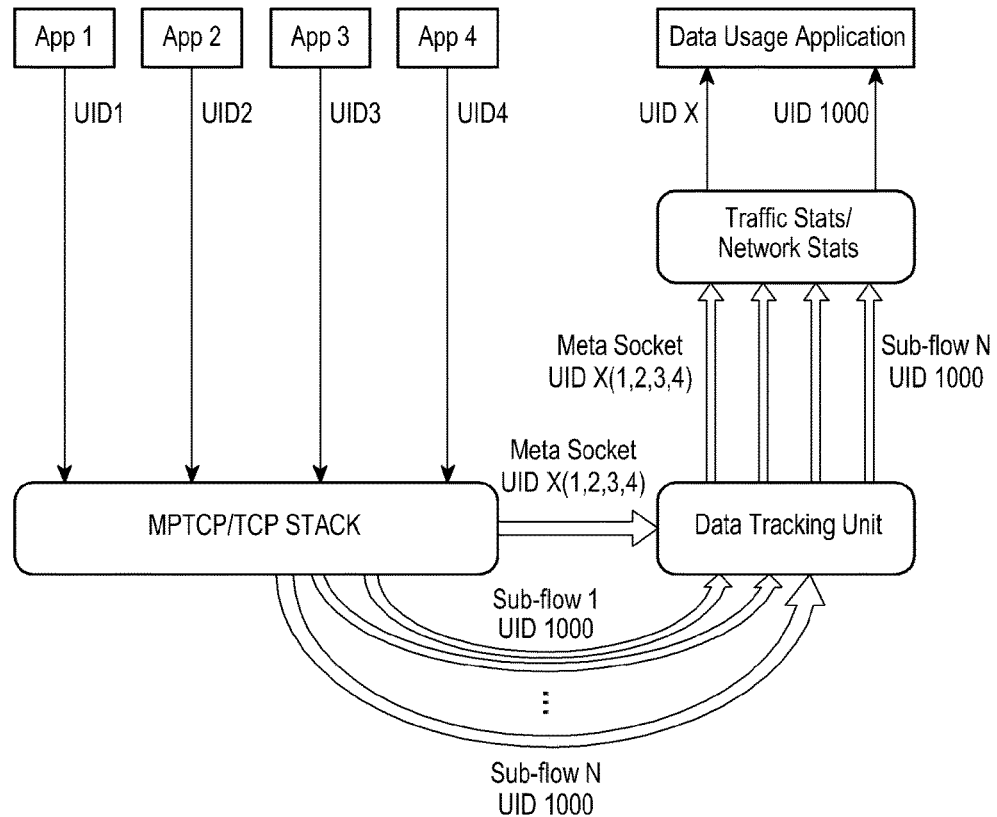
[Fig. 3B]
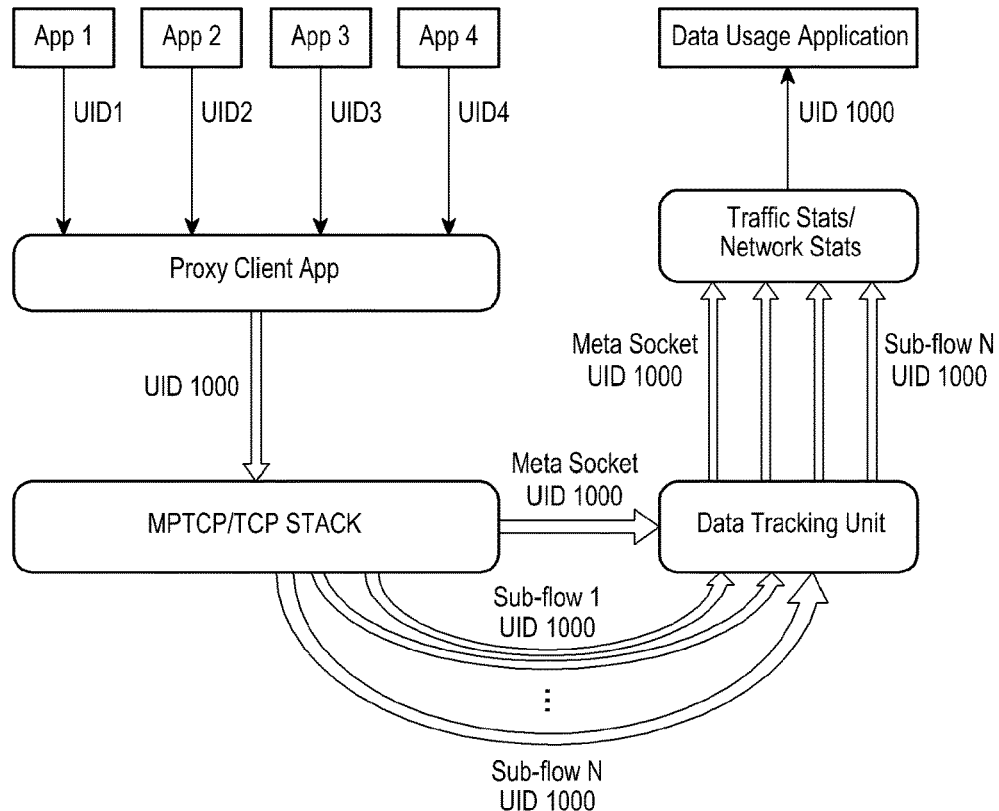

[Fig. 4A]
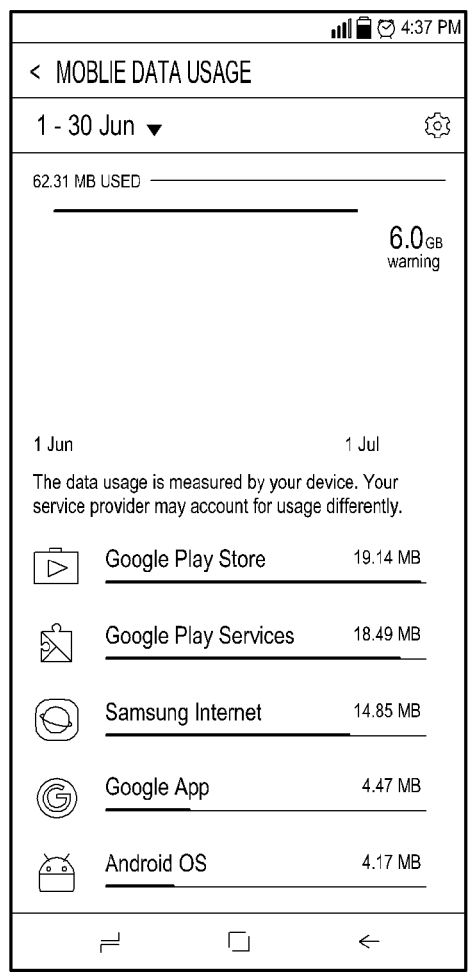

[Fig. 4B]
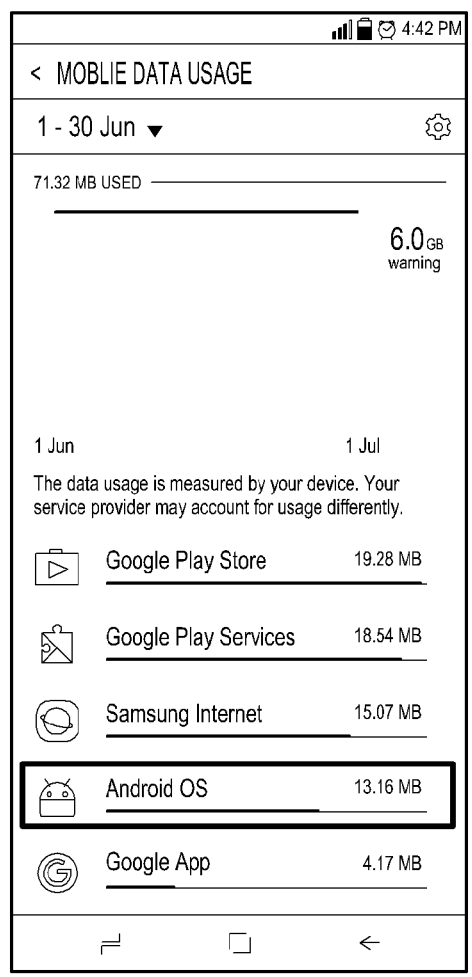

[Fig. 5A]
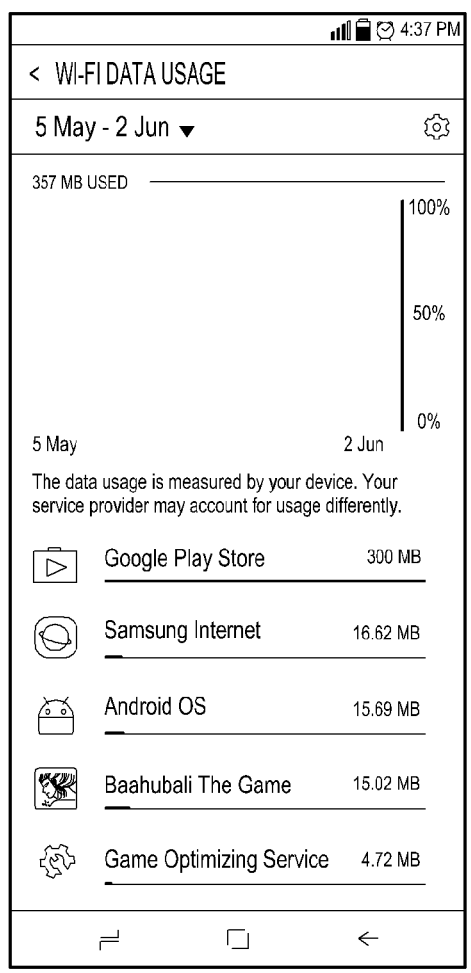

[Fig. 5B]
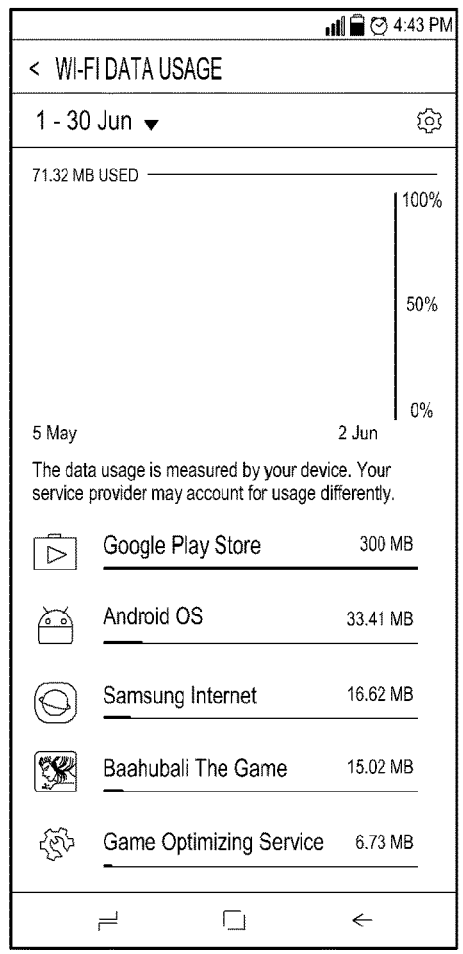
[Fig. 6]
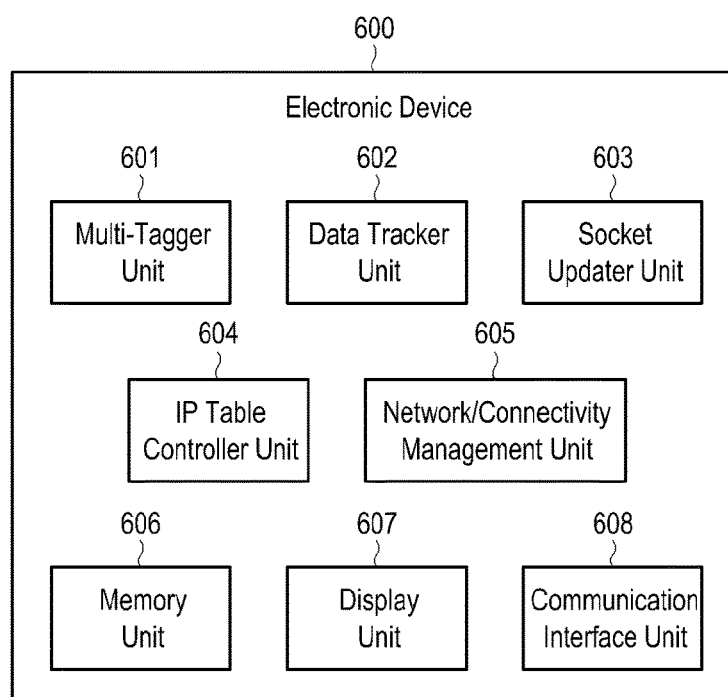

[Fig. 7A]
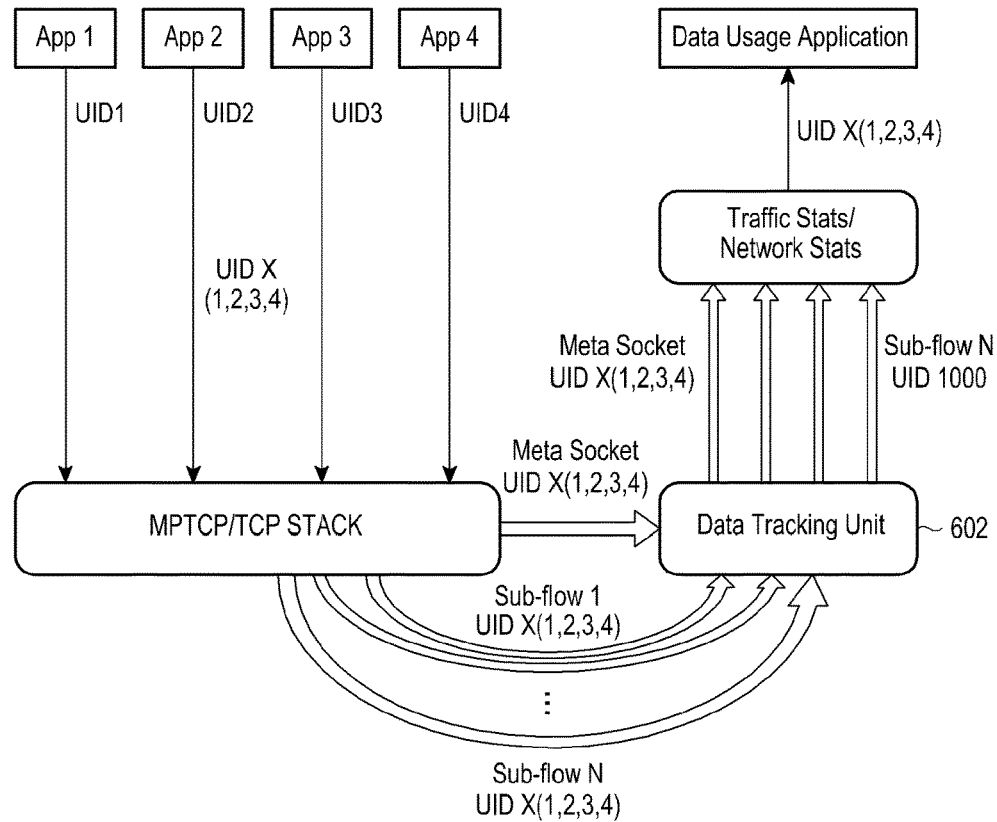
[Fig. 7B]
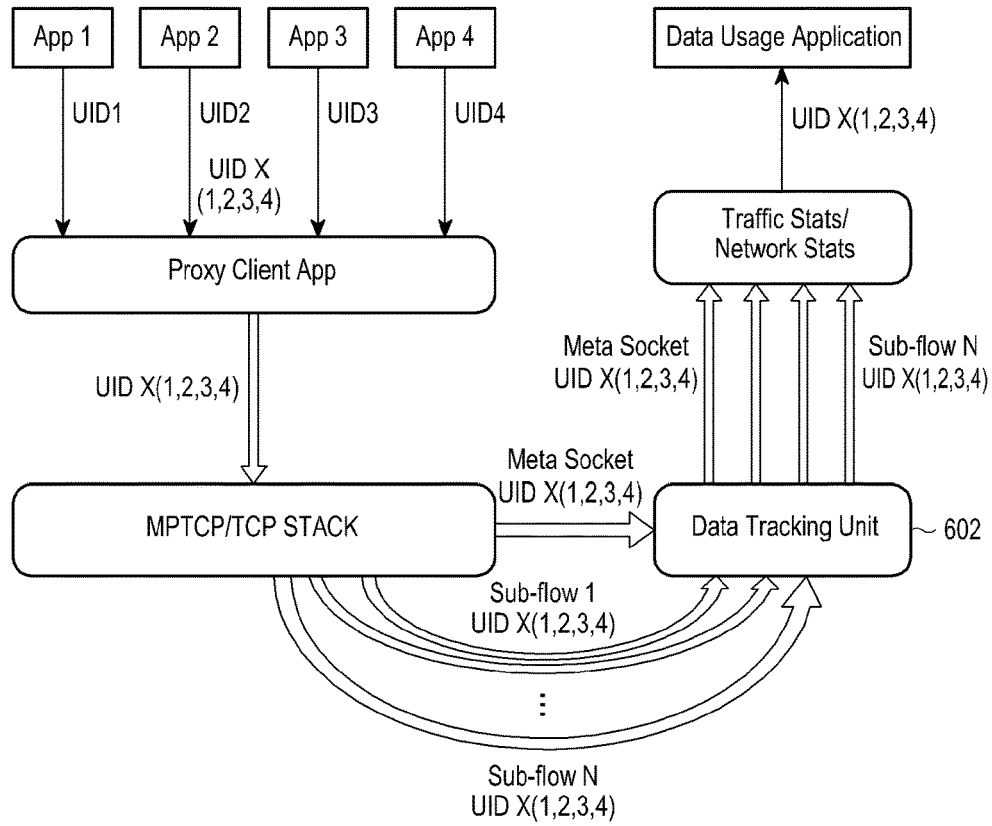

[Fig. 8A]
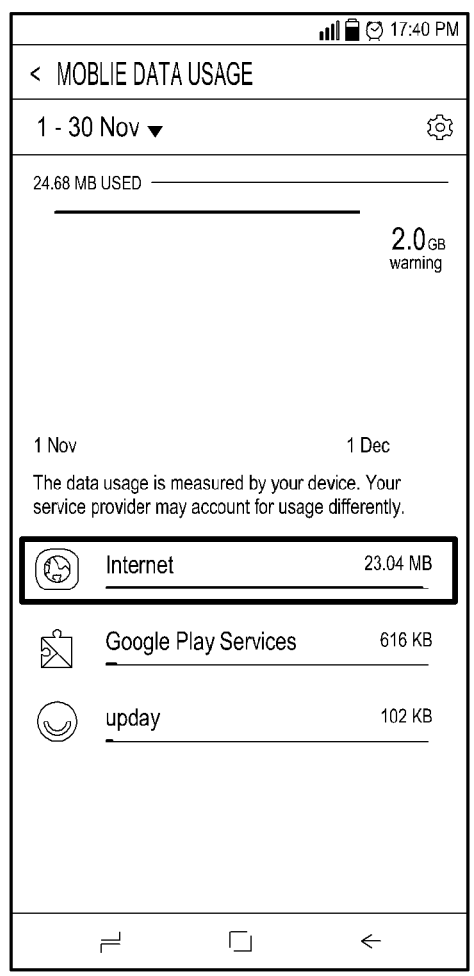

[Fig. 8B]
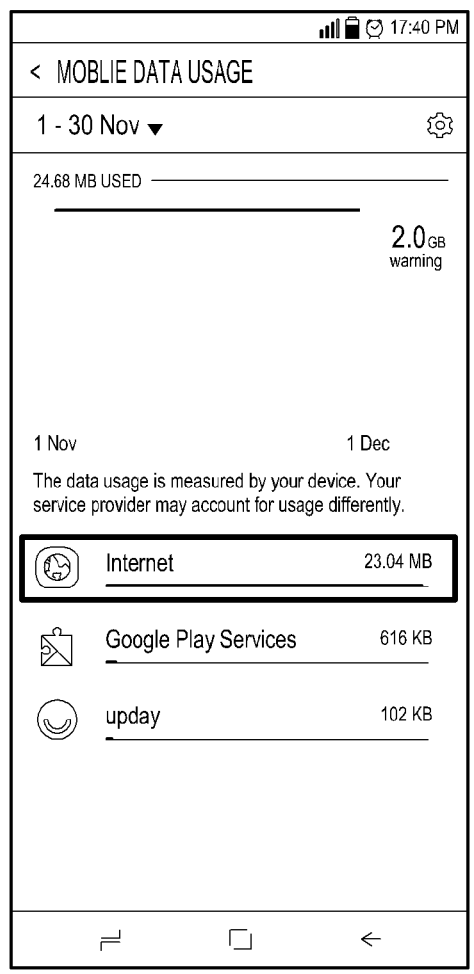

[Fig. 9A]
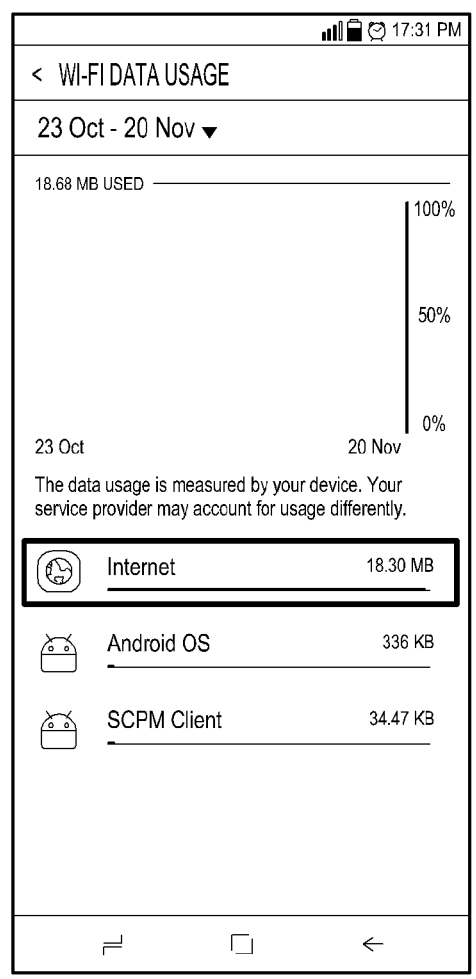

[Fig. 9B]
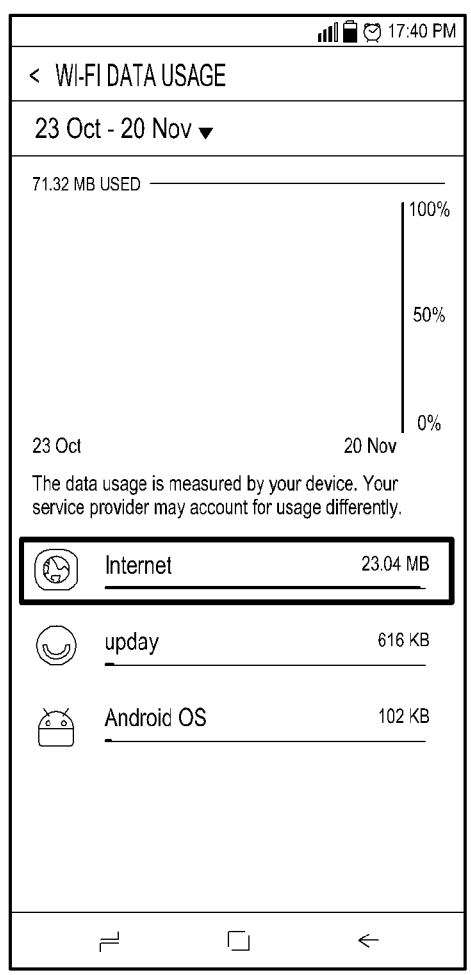

[Fig. 10A]
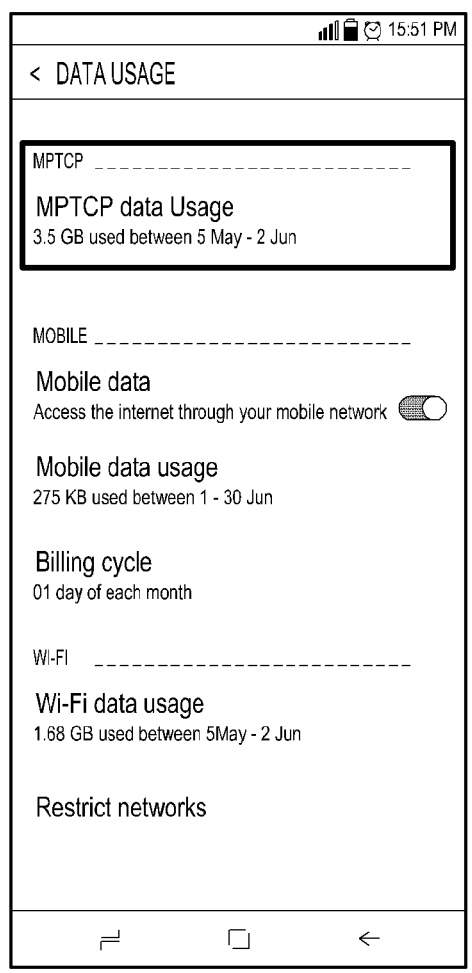

[Fig. 10B]
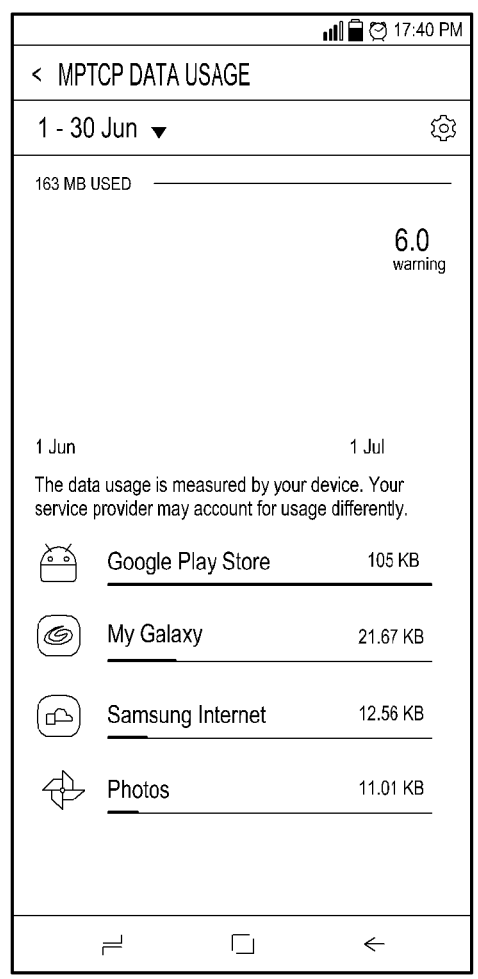

[Fig. 11]
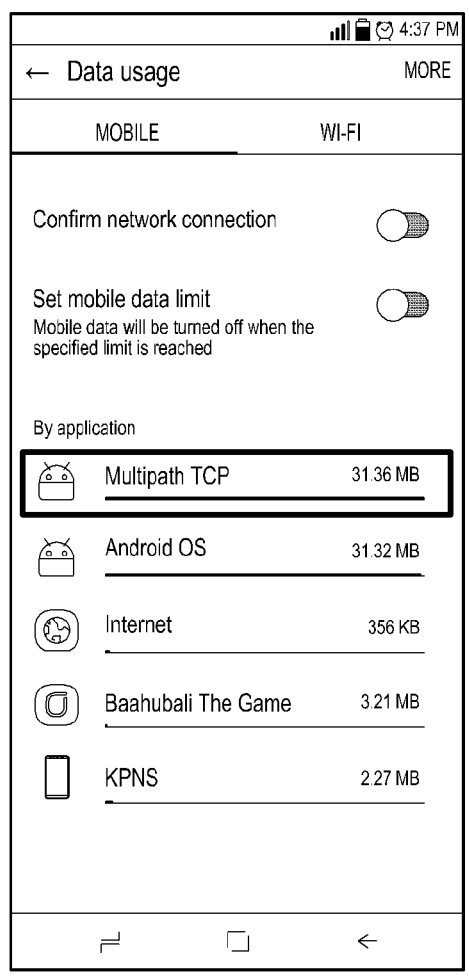

METHODS AND SYSTEMS FOR ACCOUNTING FOR DATA USAGE IN MPTCP

CROSS-REFERENCE TO RELATED APPLICATION(S)

This application is a U.S. National Stage application under 35 U.S.C. § 371 of an International application number PCT/KR2018/006307, filed on Jun. 1, 2018, which is based on and claimed priority of an Indian patent application number 201741019463, filed on Jun. 2, 2017 and of an Indian patent application number 2017 41019463, filed on May 4, 2018, in the Indian Intellectual Property Office, the disclosure of which is incorporated by reference herein in its entirety.

TECHNICAL FIELD

Embodiments herein relate to Multi-Path Transmission Control Protocol (MPTCP), and more particularly to methods and systems for accounting for data usage in MPTCP.

BACKGROUND ART

MPTCP is an adaptation of Transmission Control Protocol (TCP) which is getting popular due to simultaneous utilization of several physical paths, by electronic devices such as smart phones, desktops, laptops, tablets, and so on; through multiple network communication interfaces such as Long Term Evolution (LTE), Wi-Fi, and so on. The MPTCP could function either as an end server, or as a proxy. The models, which can be used for deploying MPTCP in current mobile environment, are direct model, proxy model, and so on. There are no mechanisms in the models by which MPTCP data usage or MPTCP data transfer can be accounted. Considering that a user is accessing Internet using MPTCP in a smart phone. Regardless of the model in which the MPTCP is operating, the user cannot determine the amount of data that has been used in the MPTCP, the amount of data transferred through a specific network interface in the MPTCP, the amount of data usage by an application in the MPTCP, and so on. This is due to the fact that all data may be accounted to the system Unique Identifier (UID) associated with the sockets carrying the data.

FIG. 1 depicts accounting of data usage by applications using UID of the applications. Currently, an application can create a (TCP/UDP) socket using LIBC (Library of C functions) with its User Identifier (UID). The socket thus created is associated with the UID of the application. A data tracking unit (data accounting module) can utilize the UID information, associated with the socket, for accounting data usage of the application.

FIG. 2 depicts architecture of MPTCP. As depicted in FIG. 2, the MPTCP comprises a Meta socket, a master sub-socket (the first sub-flow) and slave sub-socket(s). Once a socket is created by an application using its UID, the UID of the application can be passed to the Meta socket. The MPTCP stack can create the master sub-socket (Primary Socket S1) and the slave sub-socket(s) (Secondary Sockets S2). The data accounting module can be aware of the UID of the application (Meta socket). As the other sockets S1 and S2 are created by MPTCP stack inside kernel of an Operating System (OS), the UID assigned to the sockets S1 and S2 is identical to the OS UID. Hence data transferred through the S1 and S2 sockets would be associated with the OS UID.

FIGS. 3A and 3B depict operation of MPTCP in direct and proxy models respectively. Consider an example scenario where four applications, which contribute to transfer of data. Each of the applications can be associated with a unique UID, viz., UID 1, UID 2, UID 3 and UID 4; and sub-sockets can be created for the transfer of data from the four applications in a predefined number of sub-flows. The MPCTP/TCP stack can create a predefined number of sub-sockets to transfer data from the applications in the predefined number of sub-flows. A Meta socket is created, which includes the UIDs (UID X (1, 2, 3, 4)) of the applications. However, the UIDs of the sub-sockets created by the MPCTP/TCP stack, which are meant to transfer the data in the predefined number of sub-flows, may be same (equal to the system UID 1000). The data tracking unit (such as qtaguid in Android systems) may not be able to distinguish, based on the data, between the applications. As such data accounting may be incorrect. A proxy client application can be included in case the server is not MPTCP compatible.

FIGS. 4A and 4B depict an example scenario in which data usage of a plurality of applications using mobile data is incorrectly accounted to the system UID. The data usage by the plurality of applications prior to the data transfer using MPTCP is as depicted in FIG. 4A. Each of the applications can be associated with a UID. For non-MPTCP connections, sockets can be created using the respective UIDs of the applications; and data traffic monitoring or data usage of each of the plurality of applications can be accounted using the associated UIDs. For MPTCP connections, the sub-sockets, to transfer data from the plurality of applications in a plurality of sub-flows, are created in the kernel. As such the sub-flows are associated with the system (OS) UID and the data traffic from the different applications may be accounted to the system UID. As depicted in FIG. 4B, considering that a browser application has consumed data, the data usage is accounted to the system UID.

FIGS. 5A and 5B depict an example scenario in which data usage of a plurality of applications using Wi-Fi is incorrectly accounted to the system UID. The data usage by the plurality of applications prior to the data transfer using MPTCP is as depicted in FIG. 5A. Each of the applications can be associated with a UID. For non-MPTCP connections, sockets can be created using the respective UIDs of the applications; and data traffic monitoring or data usage of each of the plurality of applications can be accounted using the associated UIDs. For MPTCP connections, the sub-sockets, to transfer data from the plurality of applications in a plurality of sub-flows, are created in the kernel. As such the sub-flows are associated with the system (OS) UID and the data traffic from the different applications may be accounted to the system UID. As depicted in FIG. 5B, considering that a browser application has consumed data, the data usage is accounted to the system UID.

DISCLOSURE OF INVENTION

Technical Problem

The principal object of the embodiments herein is to disclose methods and systems for accounting for MPTCP data usage.

Another object of the embodiments herein is to account for MPTCP sub-flow data of an application using its UID.

Another object of the embodiments herein is to dedicatedly account for MPTCP data usage.

Solution to Problem

Accordingly embodiments herein provide methods and systems for accounting for MPTCP data usage or data transfer. The embodiments include tracking MPTCP packets of a plurality of applications using UIDs of each of the plurality of applications. The MPTCP packets of each of a plurality of applications can be tagged with the UIDs of each of the plurality of applications. The embodiments include accounting number of transmitted MPTCP packets of each of the plurality of applications to each of the plurality of UIDs. The embodiments include identifying the MPTCP packets of at least one of the plurality of applications in at least one of a plurality of sub-sockets. Each of the plurality of sub-sockets can be associated with a system UID. The embodiments include updating the system UID, associated with each of the plurality of sub-sockets, with at least one of the plurality of UIDs of at least one of the plurality of applications.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the spirit thereof, and the embodiments herein include all such modifications.

Advantageous Effects of Invention

An embodiment of the present invention discloses methods and systems for accounting for MPTCP data usage.

An embodiment of the present invention enables to account for MPTCP sub-flow data of an application using its UID.

An embodiment of the present invention enables to dedicatedly account for MPTCP data usage.

BRIEF DESCRIPTION OF DRAWINGS

The above and other aspects, features and advantages of certain exemplary embodiments of the present invention will be more apparent from the following description taken in conjunction with the accompanying drawings, in which:

FIG. 1 depicts accounting of data usage by applications using UID of the applications;

FIG. 2 depicts architecture of MPTCP;

FIGS. 3A and 3B depict operation of MPTCP in direct and proxy models respectively;

FIGS. 4A and 4B depict an example scenario in which data usage of a plurality of applications using mobile data is incorrectly accounted to the system UID;

FIGS. 5A and 5B depict an example scenario in which data usage of a plurality of applications using Wi-Fi is incorrectly accounted to the system UID;

FIG. 6 depicts various units of an electronic device for accounting for MPTCP data usage, according to embodiments as disclosed herein;

FIGS. 7A and 7B depict operation of MPTCP in direct and proxy models respectively, using multi-tagger and data tracker modules, according to embodiments as disclosed herein;

FIGS. 8A and 8B depict an example scenario in which data usage of a plurality of applications using mobile data is accounted to the respective UIDs, according to embodiments as disclosed herein;

FIGS. 9A and 9B depict an example scenario in which data usage of a plurality of applications using Wi-Fi is accounted to the respective UIDs, according to embodiments as disclosed herein;

FIGS. 10A and 10B depict dedicated accounting of MPTCP data usage, according to embodiments as disclosed herein; and FIG. 11 depicts dedicated creation of UID for dedicated accounting of MPTCP data usage, for different air interfaces, according to embodiments as disclosed herein.

MODE FOR THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

Embodiments herein disclose methods and systems for accounting for MPTCP data usage. The embodiments include tracking MPTCP data usage of a plurality of applications. The embodiments include reporting the MPTCP data usage information to a data tracking module. Each of the plurality of applications can be associated with a UID, which is tagged with MPTCP packets of the plurality of applications. The MPTCP packets of the plurality of applications can be transferred through at least one sub-socket, in at least one sub-flow. The at least one sub-flow can be associated with the system (OS) ID. The embodiments include updating the system UID, associated with the at least one sub-flow, with UIDs of the applications, whose data is included in the at least one sub-flow.

Referring now to the drawings, and more particularly to FIGS. 6 through 11 and, where similar reference characters denote corresponding features consistently throughout the figures, there are shown preferred embodiments.

FIG. 6 depicts various units of an electronic device 600 for accounting for MPTCP data usage, according to embodiments as disclosed herein. The electronic device 600 can be a smart phone, a laptop, a tablet, a phablet, a desktop, a wearable computing device, an IoT (Internet of Things) device, or any other device capable of using MPTCP. As depicted in FIG. 6, the electronic device 600 can include a multi-tagger unit 601, a data tracker unit 602, a socket updater unit 603, an IP table controller unit 604, a network or connectivity management unit 605, a memory unit 606, a display unit 607, and a communication interface unit 608. The units can account MPTCP data usage separately for each application/service installed in the electronic device 600. The units can also dedicatedly account for MCTCP data usage through a type of air interface. The units can account MPTCP data usage of an application using UID of the application.

The multi-tagger unit 601 can track MPTCP data usage of the applications/services installed in the electronic device 600. The MPTCP packets of the applications/services can be tagged with the respective UIDs of the applications/services. The MPTCP data usage information of each of the applications/services can be accounted by the data tracker unit 602. The tagged information (MPTCP packets tagged with the UIDs) can be provided to the data tracker unit 602. The tagged information (UIDs) can be provided to the data tracker unit 602 in socket file descriptors.

The MPTCP/TCP stack can create a Meta-socket and a plurality of sub-sockets. The Meta-socket can include the UIDs of the applications/services. The sub-sockets can be created to transfer MPTCP data in a plurality of sub-flows. Each sub-flow can carry MPTCP data of multiple applications/services. The sub-sockets can be created using system (OS) UID. The sub-sockets can be associated with the system UID. The socket updater unit 603 can update the system UID with the corresponding UIDs of respective applications/services based on the tagged UIDs of the respective applications/services, received from the multi-tagger unit 601, if the sub-sockets include MPTCP data of the respective applications/services. The update can be performed in the data tracker unit 602. This prevents a possibility of misinterpretation by the data tracker unit 602, due to which the MPTCP data usage of the respective applications/services is accounted to the system UID.

The multi-tagger unit 601 can utilize the IP table controller unit 604 for dedicated tracking of MPTCP data. The network or connectivity management unit 605 can detect the type of air interface (mobile data, Wi-Fi, and so on) through which MPTCP data transfer takes place, in the electronic device 600. In an example, the data transfer can take place through mobile data, Wi-Fi, or both. The network or connectivity management unit 605 can detect changes in the type of air interface, through which data transfer takes place. Based on changes in the air interface, intent can be triggered.

When the multi-tagger unit 601 receives the intent, the multi-tagger unit 601 can create a filter for filtering the MPTCP packets. The filter can be used for tracking the MPTCP packets through predefined rules using the IP table controller unit 604. The tracked MPTCP data usage information can be provided to the data tracker unit 602. Based on the MPTCP data usage obtained from the data tracker unit 602, accurate traffic statistics (MPTCP/non-MPTCP data traffic) can be provided to a data usage application for displaying the MPTCP data usage information to a user of the electronic device 600, storing the MPTCP data usage information in the memory unit 606, a remote memory, cloud, and so on.

The memory unit 606 can store MPTCP data usage statistics of installed applications/services. The memory unit 606 can also store MPTCP data usage statistics through a particular type of air interface. The display unit 607 can display the MPTCP data usage through a type of air interface and MPTCP data usage of each installed application/service by accounting transmitted MPTCP packets of an installed application/service to the UID of the installed application/service on the screen of the electronic device 600. The communication interface unit 608 can receive and transmit MPTCP packets.

FIG. 6 shows exemplary units of the electronic device 600, but it is to be understood that other embodiments are not limited thereon. In other embodiments, the electronic device 600 may include less or more number of units. Further, the labels or names of the units are used only for illustrative purpose and does not limit the scope of the embodiments herein. One or more units can be combined together to perform same or substantially similar function in the electronic device 600.

FIGS. 7A and 7B depict operation of MPTCP in direct and proxy models respectively, using the multi-tagger and the data tracker modules, according to embodiments as disclosed herein. In an example, considering that there are four applications, which contribute to transfer of data from the electronic device 600. The UIDs associated with each of the applications can be UID 1, UID 2, UID 3 and UID 4 respectively. The UIDs of the applications can be tagged, by the multi-tagger unit 601, with the MPTCP packets from the respective applications. The tagged information can be provided to the data tracker unit 602 in a socket file descriptor. The MPCTP/TCP stack can create sub-sockets to transfer data from the applications in sub-flows. A Meta socket can be created, which includes the UIDs (UID X (1, 2, 3, 4)) of the applications. The embodiments include tracking MPTCP data usage of the applications and providing the tracking information to the data tracker unit 602.

The MPTCP data from the four applications can be transferred through a predefined number of sub-flows. The UIDs of the sub-sockets, created by the MPTCP/TCP stack, can be equal to the system UID. Since all the sub-flows are having the same UID, it may be impossible to discern the application to which the MPTCP data actually belongs. Considering that the sub-sockets include MPTCP data from an application, the embodiments include updating the system UID of the sub-sockets with the UID of the application, which is the originator of the MPTCP data. The socket updater unit 603 can update the system UID with the corresponding UID of the application based on the tagged UIDs, received from the multi-tagger unit 601. A proxy client application can be included in case the server is not MPTCP compatible.

FIGS. 8A and 8B depict an example scenario in which data usage of a plurality of applications using mobile data is accounted to the respective UIDs, according to embodiments as disclosed herein. The data usage by the plurality of applications prior to the data transfer is as depicted in FIG. 8A. Each of the applications can be associated with a UID. For MPTCP connections, sub-sockets can be created, which transfer MPTCP data from the plurality of applications in a plurality of sub-flows. The kernel can create the sub-flows. As such the sub-flows are associated with the system UID and the data traffic from the different applications may be accounted to the system UID. The embodiments include updating the system UID with the UID of the application to which the data belongs. This allows correct accounting of MPTCP data usage. As depicted in FIG. 8B, considering that a browser application has consumed data, the data usage is accounted to the UID of the browser by updating the system UID with the UID of the browser.

FIGS. 9A and 9B depict an example scenario in which data usage of a plurality of applications using Wi-Fi is accounted to the respective UIDs, according to embodiments as disclosed herein. The data usage by the plurality of applications prior to the data transfer is as depicted in FIG. 9A. Each of the applications can be associated with a UID. For MPTCP connections, sub-sockets can be created, which transfer MPTCP data from the plurality of applications in a plurality of sub-flows. The kernel can create the sub-flows. As such the sub-flows are associated with the system UID and the data traffic from the different applications may be accounted to the system UID. The embodiments include updating the system UID with the UID of the application to which the data belongs. This allows correct accounting of MPTCP data usage. As depicted in FIG. 9B, considering that a browser application has consumed data, the data usage is accounted to the UID of the browser by updating the system UID with the UID of the browser.

FIGS. 10A and 10B depict dedicated accounting of MPTCP data usage, according to embodiments as disclosed herein. As depicted in FIG. 10A, the embodiments include displaying a dedicated tab to a user of the electronic device 600 to view MPTCP data usage. When the tab is clicked, the user can view data consumption of each application through MPTCP (depicted in FIG. 10B) on the screen of the electronic device 600. The MPTCP data usage and non-MPTCP data usage of each application can be accounted to the respective UID of the application separately. The embodiments include filtering the MPTCP packets and tracking the MPTCP packets based on rules designed using IP table controller unit 604.

FIG. 11 depicts dedicated creation of UID for dedicated accounting of MPTCP data usage, for different air interfaces, according to embodiments as disclosed herein. As depicted in FIG. 11, the embodiments include classifying MPTCP/non-MPTCP data by assigning a UID to dedicatedly account for MPTCP data usage. The MPTCP data transfer occurring through different air interfaces can be categorized and displayed to the user of the electronic device 600. The user can dedicatedly track MPTCP data usage through a particular air interface.

The embodiments disclosed herein can be implemented through at least one software program running on at least one hardware device and performing network management functions to control the network elements. The network elements shown in FIG. 6 include blocks, which can be at least one of a hardware device, or a combination of hardware device and software module.

The embodiments disclosed herein describe methods and systems for accounting for data usage in MPTCP. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for accounting multi-path transmission control protocol (MPTCP) data usage by an electronic device, the method comprising:
    identifying sub-sockets having a same system unique identifier (UID), wherein each of the sub-sockets corresponds to one of applications and carries MPTCP packets of corresponding application among the applications;
    updating the same system UID allocated to each of the sub-sockets with a UID of the corresponding application, wherein MPTCP data of the corresponding application is transferred through a sub-socket having a updated UID corresponding to the application;
    filtering the MPTCP packets based on at least one predefined rule for tracking the MPTCP packets;
    determining the MPTCP data usage of each of the applications based on UIDs corresponding to the applications tagged with the MPTCP packets; and
    displaying the determined MPTCP data usage of each of the applications, wherein the MPTCP data usage indicates a number of transmitted MPTCP packets.

2. The method of claim 1, wherein the MPTCP data usage of each of the applications is displayed based on at least one of: the UIDs, and the MPTCP packets transmitted through a type of air interface.

3. The method of claim 1, wherein the method further comprises storing MPTCP data usage statistics of each of the applications or MPTCP data usage statistics through a type of air interface.

4. An electronic device for determining multi-path transmission control protocol (MPTCP) data usage, the electronic device comprising:

a transceiver; and at least one processor coupled to the transceiver, wherein the at least one processor is configured to:

identify sub-sockets having a same system unique identifier (UID), wherein each of the sub-sockets corresponds to one of applications and carries MPTCP packets of corresponding application among the applications, update the same system UID allocated to each of the sub-sockets with a UID of the corresponding application, wherein MPTCP data of the corresponding application is transferred through a sub-socket having a updated UID corresponding to the application, filter the MPTCP packets based on at least one predefined rule for tracking the MPTCP packets, determine the MPTCP data usage of each of the applications based on UIDs corresponding to the applications tagged with the MPTCP packets, and display the determined MPTCP data usage of each of the applications, wherein the MPTCP data usage indicates a number of transmitted MPTCP packets.

5. The electronic device of claim 4, wherein the MPTCP data usage of each of the applications is displayed based on at least one of: the UIDs, and the MPTCP packets transmitted through a type of air interface.

6. The electronic device of claim 4, wherein the processor is further configured to store MPTCP data usage statistics each of the applications or MPTCP data usage statistics through a type of air interface.

* * * * *